Figure 1:
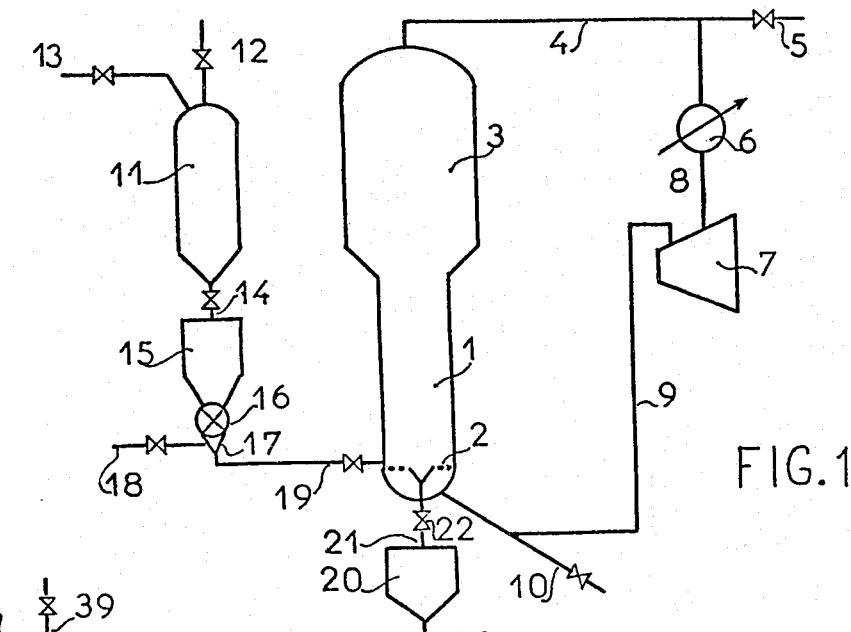

United States Patent [19]

Roger et al.

[11] 3,922,322

[45] Nov. 25, 1975

[54] PROCESS FOR DRY POLYMERIZATION OF OLEFINS

[75] Inventors: Dormenval Roger, Carry-le-Rouet; Havas Laszlo; Mangin Pierre, both of Martiques, all of France

[73] Assignee: Naphtachimie, Paris, France

[22] Filed: Nov. 15, 1973

[21] Appl. No.: 416,045

[30] Foreign Application Priority Data
Nov. 17, 1972 France............................ 72.40810

[52] U.S. Cl........ 260/878 B; 260/93.7; 260/94.9 B; 260/94.9 DA; 260/94.9 P
[51] Int. Cl.² ................ C08L 23/26; C08F 255/02
[58] Field of Search ...... 260/93.7, 94.9 B, 94.9 DA, 260/94.9 P, 878 B

[56] References Cited
UNITED STATES PATENTS

| | | | |
|---|---|---|---|
| 3,324,101 | 6/1967 | Baker et al................. | 260/94.9 DA |
| 3,475,517 | 10/1969 | Renaudo....................... | 260/878 B |
| 3,514,501 | 5/1970 | Leibson et al................. | 260/94.9 P |
| 3,776,979 | 12/1973 | Hill.................................. | 260/878 B |
| 3,779,712 | 12/1973 | Calvert et al.................. | 260/94.9 P |
| 3,790,550 | 2/1974 | Miller............................. | 260/93.7 |

FOREIGN PATENTS OR APPLICATIONS 1,006,469   10/1965   United Kingdom................ 260/878

*Primary Examiner*—Alan Holler

[57] ABSTRACT

A dry process for polymerizing olefins to produce polymers having a molecular weight above 50,000 wherein the olefin or olefins to be polymerized are circulated with hydrogen upwardly through a reaction vessel for reaction in the presence of a solid catalyst which has been separately introduced into the reaction vessel with a stream of hydrogen and in which the catalyst is formed of a catalytically active solid compound of a transition metal of sub-groups IVa, Va and VIa of the periodic table of elements, and at least one co-catalyst formed of an organo-metallic compound of a metal of groups II or III of the periodic table.

12 Claims, 2 Drawing Figures

PROCESS FOR DRY POLYMERIZATION OF OLEFINS

This invention concerns a process for the dry polymerization of olefins wherein the olefins in the gaseous state are directly converted into solid polymers or copolymers having a molecular weight which is generally higher than 50,000. The process of the invention can be used in particular for the polymerization of ethylene alone or in mixture with other olefins.

It is known that an olefin may be dry-polymerized from a gaseous mixture containing the olefin to be polymerized, for example in a reaction vessel in which the solid polymer, in the course of being formed, is kept in the fluidized state by means of a rising stream of the gaseous mixture. At the outlet from the reaction vessel, the gaseous mixture is generally cooled before being recycled to the reaction vessel, concurrently with a fresh amount of the olefin to be polymerized. Polymerization is carried out in the presence of a catalytic system which, in most cases, comprises a solid catalyst comprising a compound of transition metal and a co-catalyst formed of an organic compound of a light metal. The catalyst can be used either directly in powder form or associated with a solid granular carrier, or in the form of a pre-polymer which is prepared by preliminary polymerization of one or more olefins in the presence of the catalyst.

It has already been proposed, in the above-described methods for the dry polymerization of olefins, that the dry catalyst be introduced into the reaction zone directly in the dry state. However, it is difficult to cause the amounts of catalyst introduced to circulate in the conduits. It has also been proposed that the catalyst be introduced into the reaction zone by means of a carrier gas, for example an inert gas such as nitrogen or a light aliphatic hydrocarbon, but this has the disadvantage of introducing diluents into the reaction medium. It has also been proposed that the catalyst be introduced at the same time as the olefin to be polymerized. This gives rise to the danger of causing polymerization to start outside of the reaction zone proper.

Although dry polymerization of olefins is currently carried out in the presence of gaseous hydrogen, in order to exercise control over the mean molecular weight of the polymer formed, it has not heretofore been proposed that hydrogen should be used as the carrier gas, in view of its generally admitted harmful action on the catalytic activity of the transition metal compounds.

It has not been found that it is possible to preserve solid substances containing transition metals in a hydrogen atmosphere and to introduce these substances into the polymerization reaction vessel by means of hydrogen, without affecting the catalytic activity of the transition metal compounds.

The invention therefore provides, and it is an object of this invention to provide for the production of polymers having a molecular weight which is generally higher than 50,000, from olefins having the formula $CH_2=CHR$ in which R is a hydrogen atom or an alkyl radical having up to 8 carbon atoms, in the presence of a catalytic system formed of a solid having catalytic activity comprising a solid compound of a transition metal of sub-groups IVa, Va and VIa of the periodic table of elements, and at least one co-catalyst formed of an organo-metallic compound of a metal of groups II or III of the periodic table, the process of the invention comprising:

preserving the catalytically active solid in a hydrogen atmosphere;

separately introducing into a reaction vessel for the dry polymerization of the olefins, on the one hand some olefin or olefins to be polymerized and on the other hand the catalytically active solid, the latter being introduced into the reaction vessel by means of a stream of hydrogen;

circulating a rising stream of a gaseous mixture containing the olefin or olefins to be polymerized, and hydrogen in the reaction vessel during formation of the polymer;

recycling to the reaction vessel the gases issuing therefrom, if necessary after the said gases have been cooled; and removing at least a part of the polymer contained in the reaction vessel.

The process of the invention is preferably used for the production of polyethylene or the production of copolymers of ethylene and other olefins having the above-mentioned formula $CH_2=CHR$.

Representative of the transition metals of groups IVa, Va or VIa of the periodic table of elements, referred to in the preceding paragraph, are titanium, vanadium, chromium, zirconium, niobium, molybdenum, hafnium, tantalum, tungsten, thorium and uranium.

The solid compound of a transition metal is advantageously selected from compounds of trivalent titanium having the general formula $TiX_{3-m}(OR)_m$ in which X represents a halogen atom, generally chlorine, R represents an alkyl radical which contains from 2 to 8 carbon atoms and m represents an integer or a fraction which can be of any value of from 0 to 3. These trivalent titanium compounds are currently produced by the reduction, for example by means of organo-aluminum compounds, compounds of tetravalent titanium having the formula $TiX_{4-n}(OR)_n$, in which X and R are of the same definitions as above, and n is an integer or a fraction which can be of any value from 0 to 4. The compounds having the formula $TiX_{4-n}(OR)_n$ in which n is other than either 0 or 4, can be produced from calculated amounts of titanium tetrahalide having the formula $TiX_4$ and an alkyl titanate, having the formula $Ti(OR)_4$, in accordance with a functional interchange reaction which can be written as follows:

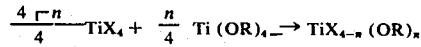

$$\frac{4-n}{4} TiX_4 + \frac{n}{4} Ti(OR)_4 \rightarrow TiX_{4-n}(OR)_n$$

The solid compound of a transition metal can also comprise a solid compound of a transition metal and magnesium, which compound can be produced, for example, by a reaction between a compound of tetravalent titanium, metallic magnesium and an alkul halide.

The catalytically active solid can comprise the solid compound of a transition metal itself, or can be associated with a solid carrier formed, for example, by granulates of silica, alumina or magnesia on which the transition metal compound is deposited or fixed. Preferably, however, the catalytically active solid comprises a pre-polymer produced by means of previous polymerization of one or more olefins within an inert liquid, such as an aliphatic hydrocarbon, and in the presence of a solid compound of a transition metal as defined above, together with a co-catalyst, such as an organoaluminum compound. Pre-polymerization is stopped after the formation of a moderate amount of the polymer, which amount, in most cases, is between 1 and 500 g per milligram-atoms of transition metal of the catalyst.

After separation from the liquid in which it was prepared, the pre-polymer in which the transition metal compound remains can then be used directly as the catalytically active solid. However, it is preferable to subject the prepolymer, before it is used in the process of the invention, to one or more extraction steps by means of a solvent, such as an aliphatic hydrocarbon, in order to create porosity within the granulates of the prepolymer. This porosity improves the accessibility of the olefins to the catalytic areas; it makes it possible also to impregnate the pre-polymer with a liquid organo-metallic compound which acts as co-catalyst in the dry polymerization operation.

Polymerization is advantageously carried out in a fluidized bed reaction vessel in which the polymer, present in the reaction vessel, is kept in the fluidized state in a rising stream of the gaseous mixture containing the olefin or olefins to be polymerized, together with hydrogen in proportions by volume which may reach to 80% of the gaseous mixture. The latter is formed, in part, by the gaseous mixture which issues from the reaction vessel and which is recycled, in part, by an amount of the olefin or olefins to be polymerized, which amount is introduced into the reaction circuit and, finally, by the hydrogen introduced with the catalyst. Introducing this amount of hydrogen makes it possible at least partially to replace the hydrogen which is consumed during the polymerization step, the hydrogen which is discharged with the polymer, and the hydrogen which is lost by virtue of purges which are liable to be carried out on the circuit. It is obviously possible to adjust the hydrogen content of the gaseous reaction mixture by directly introducing into the reaction vessel a make-up amount of hydrogen.

The speed of rise to be imparted to the gaseous mixture, to maintain the polymer present in the reaction vessel in the fluidized state, is related to the physical parameters of the polymer and the gaseous mixture, the main parameters are the size of the particles of the polymer, the density thereof, and the viscosity and the density of the gaseous mixture. Speeds of rise of the order of a few decimeters per second are usually employed.

The temperature in the reaction vessel is kept at a sufficient level for rapid polymerization, without however being excessively close to the softening temperature of the polymer, in order, in the latter case, to prevent agglomeration of the polymer. In the production of polyethylene, the temperature is generally within the range of 60° to 115°C. The temperature in the reaction vessel is preferably maintained at the desired value, primarily by cooling the gaseous mixture which issues from the reaction vessel. This makes it possible to remove the heat produced during the polymerization operation.

The partial pressure, to which the olefin to be polymerized is subjected in the reaction vessel, is related to the nature of the olefin and to the temperature in the apparatus, in order to prevent the olefin being liquefied in the coldest part of the circuit. In practice, this danger can occur only with the higher homologues of ethylene. When polymerization is effected from ethylene, the temperatures are maintained at values which are higher than the critical temperature of ethylene, close to 10°C, in which case the total pressure is usually within the range of 10 to 40 bars.

The co-catalysts which are used in the process of the invention preferably comprise at least one organoaluminum compound having the general formula $AlR_nX_{3-n}$, in which R represents an alkyl group having from 1 to 12 carbon atoms, X is a hydrogen atom or a halogen atom, preferably chlorine, and $n$ is an integer or a fraction which can be of any value of from 1 to 3. The co-catalysts are advantageously used in amounts such that the atomic ratio between metals of groups II and III of the co-catalysts and transition metals of subgroups IVa, Va and VIa of the catalytically active solid is from 1 to 50. The co-catalysts can be introduced into the reaction vessel in various ways. The organoaluminum co-catalysts, which are generally liquid under normal temperature and pressure conditions, can be introduced directly into the reaction vessel. The co-catalysts can also be vaporized and mixed with the olefin or olefins introduced into the reaction vessel. Preferably, however, the co-catalysts are introduced into the reaction vessel at the same time as the catalytically active solid compound with which they have first been brought into contact. This method of introducing the co-catalysts is of particular advantage when the catalytically active solid compound comprises a prepolymer.

The gaseous mixture is in contact with the catalytically active solid compound present in the reaction vessel for only a limited time, generally less than a few tens of seconds. Because of this, only a fraction of the olefin or olefins introduced into the reaction vessel is polymerized therein, and it is, therefore, virtually necessary to recycle to the reaction vessel the gaseous effluent which issues therefrom. In order to prevent entrainment of polymer particles in the gaseous mixture issuing from the outlet from the reaction vessel, the reaction vessel can, for example, be provided in its upper part with a so-called tranquilization chamber of larger cross-section than that of the reaction vessel. In this chamber, the speed of rise of the gaseous mixture is lower than in the reaction vessel, enabling the polymer particles entrained from the reaction vessel to fall back into the reaction vessel. The polymer particles which are entrained by the gaseous mixture can also be separated in a cyclone separator and returned to the reaction vessel, preferably to the lower portion thereof. Since polymerization of olefins is exothermic, it is desirable to remove the heat produced in order to maintain a constant temperature in the reaction vessel. Such heat is preferably removed by circulating the recycled gaseous mixture through a heat exchanger which is located outside the reaction vessel.

The polymer can be removed from the reaction vessel by means of various mechanical devices. The preferred device comprises providing the lower portion of the reaction vessel with an aperture which is capable of being closed and which communicates with a chamber having a pressure lower than that in the reaction vessel. Opening the aperture for a given time makes it possible to remove into the chamber the desired amount of polymer. When the aperture is closed, the chamber can be brought into communication with the exterior for the polymer to be collected.

The process of the invention is preferably carried out in a manner such that the operating conditions of the reaction vessel are substantially constant. This mode of operation can be achieved, in practice, by circulating in the reaction vessel a gaseous mixture having substantially constant characteristics, formed for the most part of recycled gaseous mixture.

Figure 2:
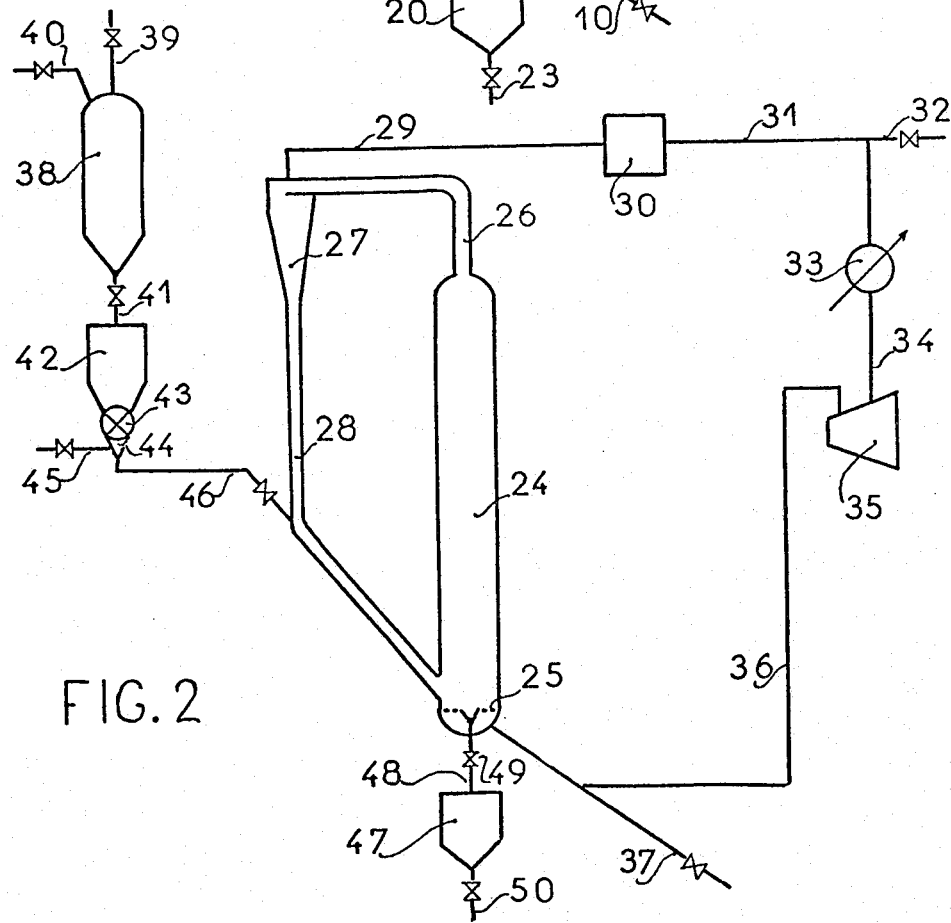

Two apparatuses which are capable of being used in the process of the invention are diagrammatically illustrated in vertical cross-section in FIGS. 1 and 2.

The apparatus shown in FIG. 1 comprises a fluidized bed reaction vessel 1 of cylindrical shape. It is provided in its lower portion with a grid 2 intended to distribute the gaseous mixture substantially uniformly over the entire horizontal cross-sections of the reaction vessel 1. The reaction vessel is provided in its upper portion with a tranquilization chamber 3, the horizontal cross-sectional area of which is greater than that of the reaction vessel. The upper portion of the chamber 3, which is in the form of a spherical dome, communicates with a conduit 4 which receives the gaseous mixture exhausted from the reaction vessel 1.

The conduit 4 is provided with a valve 5 by means of which it is possible to vent the gas circuit to carry out purge operations and with a heat exchanger 6. A compressor 7 is connected by conduit 8 to the heat exchanger 6 and by a conduit 9 to the lower portion of the reaction vessel 1, below the grid 2, which is in the form of a spherical dome. The olefins are introduced into the reaction vessel through a conduit 10, which is connected to the conduit 9. The device for feeding the catalytically active solid comprises a chamber 11 which is of general cylindro-conical shape and which is provided in its upper portion with a conduit 12 for introducing the catalytically active solid and a conduit 13 for introducing hydrogen. The chamber 11 communicates, by way of a conduit 14 which can be closed, with a chamber 15, which is also of general cylindro-conical shape. Secured at the lower end of the chamber 15 is a rotary distributor 16 which enables passage of the catalytically active solid into a channel 17, which is fed with hydrogen by way of the conduit 18. A conduit 19 feeds into the reaction vessel 1 above the grid 2. A chamber 20, which is positioned below the reaction vessel 1, is connected to an aperture on the grid 2 by way of a conduit 21 provided with a closure valve system 22. The chamber 20 communicates with the outside by way of a conduit 23 through which the polymer is discharged.

The apparatus shown in FIG. 2 comprises a fluidized bed reaction vessel 24 which is of cylindrical shape and which is provided in its lower portion with a grid 25. The upper portion of the reaction vessel 24 is connected by a conduit 26 to a cyclone separator 27 in which the solid particles entrained by the gaseous mixture from the reaction vessel 24 are separated. A conduit 28 connects the lower end of the cyclone separator 27 to the reaction vessel 24, the conduit 28 feeding into the reaction vessel 24 above the grid 25. A conduit 29, which communicates with the upper portion of the cyclone separator 27, carries the gaseous mixture from the cyclone separator 27 to a filter 30. A conduit 31, having a vent aperture 32, connects the filter 30 to a heat exchanger 33. Conduit 34 communicates the heat exchanger 33 with the feed to the compressor 35. A conduit 36 connects the outlet from the compressor 35 to the lower dome shaped portion of the reaction vessel 24, which part is located below the grid 25. The olefins are introduced into the reaction circuit through a conduit 37, connected to the conduit 36. The device for feeding the catalytically active solid is arranged as in the apparatus shown in FIG. 1, with a chamber 38, two conduits 39 and 40 respectively for supplying the chamber 38 with catalytically active solid and with hydrogen, and a conduit 41 which can be closed and which connects the chamber 38 to a cylindroconical chamber 42. A rotary distributor 43 communicates with a channel 44 to which a conduit 45 is connected for supplying hydrogen, and to which a conduit 46 is connected leading to the conduit 28. The conduit 46 provides for a feed to the reaction vessel of catalytically active solid. The device for removing the polymer is constructed as in the apparatus shown in FIG. 1, with a chamber 47 connected by a conduit 48 to the grid 25 of the reaction vessel 24. The conduit 48 is provided with a valve system 49. The chamber 47 communicates with the external medium by way of a conduit 50 by means of which the polymer is discharged.

EXAMPLE

In this example, the catalytically active solid comprises a pre-polymer.

a. Preparation of the pre-polymer

The operation is carried out in a stainless steel reaction vessel provided with a mechanical stirrer and a means for cooling or heating by circulation of a liquid in a double jacket. Two liters of n-heptane, 5.15 g (14 millimoles) of tri-n-octylaluminum and 2.16 g (14 millimoles) of a titanium trichloride (produced by reducing titanium tetrachloride by means of diethylaluminumchloride) are successively introduced into the reaction vessel. Hydrogen is then introduced into the reaction vessel until the pressure reaches 4 bars, then the contents of the reaction vessel are heated to 80°C and ethylene is introduced into the reaction vessel at a flow rate of 200 g/hour.

After polymerization for 2 hours 30 minutes, the introduction of ethylene is stopped and then the reaction vessel is degassed by means of a stream of nitrogen. The polymer produced is separated, and is then subjected to two successive extraction steps by a mixture of the pre-polymer with 2 liters of n-heptane at 80°C in each step, the pre-polymer then being separated from the n-heptane by decantation. After the second extraction step, 12.9 g (35 millimoles) of tri-n-octylaluminum is added to the concentrated suspension of prepolymer. This suspension is then dried under vacuum.

485 G of a pre-polymer, in the form of a fine powder, formed of grains having an average diameter of 150 microns, is collected.

b. Polymerization

This operation is carried out in an apparatus as illustrated in FIG. 1, the stainless steel reaction vessel 1 having a diameter of 150 mm and the tranquilization chamber 3 being 250 mm in diameter.

2 kg of a polyethylene produced in a previous production operation is introduced into the reaction vessel. A stream of nitrogen is introduced by way of the conduit 10, for a period of 1 hour at a temperature of 90°C, in order to dry the polyethylene.

The pre-polymer prepared in (a) in introduced into the chamber 11, together with hydrogen, through conduit 13. Ethylene is then introduced into the reaction vessel 1 at a temperature of 90°C through conduit 10, together with hydrogen at the same temperature through conduit 18, so that the gas in the reaction vessel comprises by volume 60% ethylene and 40% hydrogen, at a pressure of 20 bars.

The rate of flow of the gas in the reaction vessel is 15 cm/second, and 10 to 11 g of pre-polymer is introduced into the reaction vessel every 20 minutes by way of the hopper 15, the distributor 16 and the conduit 19. On each occasion the pre-polymer is blown by 5N.1 of hydrogen.

By measuring the pressure drop of the bed or the variation in the height of the bed, it is observed that the rate of polymerization is approximately 500 g/hour. The amount of polymer in the reaction vessel is maintained at a substantially constant value by taking off approximately 500 g of polymer per hour, by way of the conduit 21 and the chamber 20. The polymer which is collected is in the form of a homogenous powder having a mean grain size of about 350 microns. The polymer has an apparent volumetric mass of 0.45 g/ccm, a fluidity index of 2 at 190°C, under a load of 5 kg, and a titanium content of 100 parts by weight per million.

It will be understood that changes may be made in the details of formulation and operation without departing from the spirit of the invention, especially as defined in the following claims.

We claim:

1. A process of producing polymers having a molecular weight generally above 50,000, by polymerization of olefins having the general formula $CH_2=CHR$ in which R is selected from the group consisting of a hydrogen atom and an alkyl radical having up to 8 carbon atoms, in the presence of a prepolymer containing a catalyst formed of a catalytically active solid compound of a transition metal of sub-groups IVa, Va or VIa of the periodic table of elements, and at least one co-catalyst formed of an organo-metallic compound of a metal of groups II or III of the periodic table in which the prepolymer is prepared by polymerization of one or more olefins in an inert liquid and a solid compound of a transition metal of sub-groups IVa, Va and VIa of the periodic table of elements and a co-catalyst, comprising:

preserving the catalyst containing prepolymer solid in a hydrogen atmosphere;

separately introducing into a reaction vessel the olefin or olefins to be polymerized and the catalyst containing prepolymer solid;

circulating upwardly in the reaction vessel containing polymer in the course of being formed, a stream of a gaseous mixture containing the olefin or the olefins to be polymerized, and hydrogen, in which the polymer in the reaction vessel is fluidized by the gaseous mixture containing hydrogen and the olefin or olefins to be polymerized;

recycling to the reaction vessel the gases issuing therefrom; and removing at least a part of the polymer contained in the reaction vessel.

2. A process as claimed in claim 1 in which the catalyst containing prepolymer solid is introduced into the reaction vessel in a stream of hydrogen.

3. A process as claimed in claim 1 which includes the step of cooling the gaseous effluent from the reaction vessel before recycling to the reaction vessel.

4. A process as claimed in claim 1 in which the solid compound of a transition metal is selected from solid compounds of a metal selected from the group consisting of trivalent titanium and tetravalent titanium.

5. A process as claimed in claim 1 in which the prepolymer is subjected to one or more solvent extraction steps.

6. A process as claimed in claim 5 in which the extraction solvent is an aliphatic hydrocarbon.

7. A process as claimed in claim 1 in which the co-catalysts are used in amounts such that the atomic ratio between the metals of groups II and III of the co-catalysts and the transition metals of sub-groups IVa, Va and VIa of the catalytically active solid, is within the range of 1 to 50.

8. A process as claimed in claim 1 in which the co-catalysts comprise at least one organo-aluminum compound having the mean formula $AlR_nX_{3-n}$, in which R represents an alkyl group having from 1 to 12 carbon atoms, X represents an atom selected from the group consisting of hydrogen and halogen, and $n$ represents an integer or a fraction within the range of 1 to 3.

9. A process as claimed in claim 8 in which X is a chlorine atom.

10. A process as claimed in claim 1 which includes a cyclone separator and in which the reaction vessel comprises a polymer bed which is fluidized by the gaseous mixture containing hydrogen and the olefin or olefins to be polymerized, and means for introducing the gaseous mixture issuing from the reaction vessel into the cyclone separator for vapor solid separation, and means for returning the separated vapors from the separator to the reaction vessel.

11. A process as claimed in claim 1 in which the polymerized olefin is mainly ethylene, and in which the gaseous mixture is subjected to polymerization at a pressure within the range of 10–40 bars and a temperature within the range of 60°–115°C.

12. A process as claimed in claim 11 in which the gaseous mixture contains up to 80% by volume of hydrogen.

* * * * *

UNITED STATES PATENT OFFICE
CERTIFICATE OF CORRECTION

Patent No. 3,922,322   Dated November 25, 1975

Inventor(s) Roger Dormenval et al.

It is certified that error appears in the above-identified patent and that said Letters Patent are hereby corrected as shown below:

Change names of inventors from "Dormenval Roger, Havas Laszlo and Mangin Pierre" to -- Roger Dormenval, Laszlo Havas and Pierre Mangin --

Signed and Sealed this

*Fourth* Day of *October 1977*

[SEAL]

*Attest:*

RUTH C. MASON  
*Attesting Officer*

LUTRELLE F. PARKER  
*Acting Commissioner of Patents and Trademarks*